(12) United States Patent
Crombez

(10) Patent No.: US 6,321,144 B1
(45) Date of Patent: Nov. 20, 2001

(54) TORQUE CONTROL STRATEGY FOR MANAGEMENT OF ROLLBACK IN A WHEELED VEHICLE WHOSE POWERTRAIN INCLUDES A ROTARY ELECTRIC MACHINE

(75) Inventor: Dale Scott Crombez, Livonia, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/634,822

(22) Filed: Aug. 8, 2000

(51) Int. Cl.⁷ .................................................. B60L 15/20
(52) U.S. Cl. .......................... 701/22; 701/87; 318/432; 303/152
(58) Field of Search ................................ 701/22, 70, 78, 701/83, 87, 84; 180/65.2, 65.3, 65.8; 303/3, 152; 318/432, 139

(56) References Cited

U.S. PATENT DOCUMENTS

| | | | |
|---|---|---|---|
| 4,629,043 | 12/1986 | Matsuo et al. ...................... | 192/4 A |
| 5,376,869 | 12/1994 | Konrad ................................ | 318/587 |
| 5,467,275 | 11/1995 | Takamoto et al. .............. | 364/426.01 |
| 5,757,153 | 5/1998 | Ito et al. .............................. | 318/370 |
| 5,811,957 * | 9/1998 | Bose et al. ......................... | 318/802 |
| 5,984,034 | 11/1999 | Morisawa et al. ................. | 180/65.2 |
| 6,122,588 * | 9/2000 | Shehan et al. ....................... | 701/93 |
| 6,126,251 * | 10/2000 | Yoshii et al. ...................... | 303/152 |
| 6,231,134 * | 5/2001 | Fukasawa et al. ................. | 303/152 |

* cited by examiner

Primary Examiner—Tan Nguyen
(74) Attorney, Agent, or Firm—Gregory P. Brown; William J. Coughlin

(57) ABSTRACT

Requested brake torque and requested throttle torque are assigned opposite algebraic signs in both rollback and non-rollback states. In the non-rollback state, requested motor torque development includes a process step (206) in which requested brake torque and requested throttle torque are algebraically summed. In the rollback state, requested motor torque development includes a process step (218) in which requested throttle torque is substituted for the regeneration torque limit. In the rollback state, the difference between the requested throttle torque and the requested brake torque is compared with a zero vehicle speed regeneration torque limit (228) when the result of comparing the difference between requested throttle torque and the requested brake torque with the regeneration torque limit (222) discloses that the latter difference does not exceed the regeneration torque limit. The result is used to determine respective amounts of motor torque and friction brake torque (230, 232, 234, 236).

19 Claims, 2 Drawing Sheets

TORQUE CONTROL STRATEGY FOR MANAGEMENT OF ROLLBACK IN A WHEELED VEHICLE WHOSE POWERTRAIN INCLUDES A ROTARY ELECTRIC MACHINE

BACKGROUND OF THE INVENTION

1. Field of the Invention

This invention relates generally to control strategies for management of drivetrain torque in electric vehicles and partial electric vehicles. More specifically, it relates to a sub-strategy for management of vehicle rollback.

2. Background Information

A wheeled automotive vehicle may comprise one or more electronic modules that control various aspects of powertrain operation. Certain vehicles have a powertrain that includes a rotary electric machine. A vehicle that comprises such as a machine as the sole prime mover is commonly referred to as an electric vehicle, and in such a vehicle, batteries or fuel cells are typical power supplies for the electric machine. Vehicles that include an electric machine in association with another prime mover, an internal combustion engine for example, are sometimes called partial electric vehicles or hybrid electric vehicles.

A powertrain control module (PCM) is a name that is sometimes given to an electronic module that processes certain data to control various aspects of powertrain operation. A rotary electric machine may be one device whose operation is under the control of a PCM. Sometimes the electric machine operates as a motor that makes a positive torque contribution to powertrain torque. At other times the electric machine operates as a generator that makes a negative torque contribution to powertrain torque. Positive torque contribution from the electric machine may appear as traction torque delivered through a drivetrain of the vehicle to at least some of the wheels to propel the vehicle. Negative torque contribution from the electric machine may be used to impose braking torque on the drivetrain to brake the vehicle. In a hybrid electric vehicle, positive and negative torque contributions from the electric machine may also be used to smooth torque fluctuations due to combustion events in an associated combustion engine.

When an electric machine imposes braking torque on the drivetrain to brake the vehicle, it is operating as an electric generator. Generated electricity may be used advantageously to regenerate an electric power supply such as a battery or fuel cell. Hence, such braking is commonly referred to as regenerative braking, or sometimes simply regen for short. A vehicle that possesses regenerative braking capability typically does not rely exclusively on such braking for the vehicle service brakes. While some energy recovery is made possible by regenerative braking, it is inappropriate at certain times to invoke regenerative braking. For example, the state of charge (SOC) of a battery, or battery bank, may be such that regenerative electric current from the electric machine should not be fed, either in whole or in part, to the battery or bank. In the absence of a suitable sink for such electric current, an alternate braking means is needed.

Hence, both full and partial electric vehicles employ some form of mechanical brakes, such as friction brakes at individual wheels. Mechanical friction brakes may be hydraulic-, pneumatic-, or electric-operated. It is known to use an electronic brake controller or brake control unit (BCU) to apply relative proportions of regenerative braking and friction braking when braking is called for.

It may be considered desirable, in certain like driving situations, for certain operational characteristics of an electric vehicle to mimic those of a vehicle powered by an internal combustion engine acting through a drivetrain that has an automatic transmission. For example, when an internal combustion engine powered vehicle is operated on a horizontal surface with the automatic transmission in a forward or reverse drive gear, and without either the accelerator pedal or the brake pedal being depressed, it may be deemed desirable for the idling engine to deliver enough torque through the drivetrain to cause the vehicle to accelerate in the direction of the selected gear from zero speed to some calibratable, yet fairly small, running speed at which the torque is just sufficient to maintain that speed. This is often referred to a vehicle creep.

Application of the friction brake opposes vehicle creep. If the vehicle is on an inclined, rather than a horizontal, surface, the amount of inclination will influence vehicle creep. If the degree of inclination were to increase, creep speed would decrease, eventually reaching zero speed at some particular grade, corresponding to holding the grade. Beyond that, the torque would be insufficient to maintain even zero speed, and the vehicle would begin to roll down the grade in the opposite direction from the direction of the selected gear. This is referred to a rollback. A driver of the vehicle may see fit to apply friction brakes at any particular time while the vehicle transmission is in a forward or reverse drive with the engine idling, and is especially likely to do so to counter an incipient rollback on a grade. But some rollback may occur before the friction brakes are effective to stop it. Moreover, the driver may depress the accelerator pedal to attempt to arrest the rollback, and if both accelerator pedal and brake pedal are applied more or less concurrently, the vehicle is said to be two-pedaled. Such two-pedaling may create conflicting commands that, unless properly resolved, may interfere with prompt correction of rollback and/or create undesired effects such as powertrain torque spikes, or shudder.

Although certain rotary electric motors are capable of bi-directional operation, their inherent characteristics, and those of on-board energy storage media for powering them (e.g. batteries), may cause certain general torque control strategies not to produce desired results during vehicle rollback. For example, internal energy requirements of certain electric induction motors render them incapable of producing regenerative energy at low speeds such as those occurring during rollback. Hence, when vehicle speed is zero, meaning the vehicle is not in motion, the motor control system assumes a state for delivering electric current to the motor, rather an opposite state. When incipient rollback is sensed by the system, the current flow to the motor will be increased in an attempt to counteract the rollback. For any of various reasons however, rollback is apt not to be instantaneously countered, in which event the vehicle will actually begin rolling back. At some rollback speed, which is a function of motor and drivetrain characteristics, the motor will inherently generate counter EMF sufficient to create an opposing electric current sufficient to cancel the current flow from the on-board storage medium. At greater speeds, the direction of current flow reverses, initiating regenerative current. Should the state of the on-board energy storage medium be inappropriate for sinking this regenerative current, an undesirable condition may ensue.

It is toward avoiding undesired conditions, such as that one, that the present invention is directed.

Such conditions may be even further complicated by certain torque management strategies at and near zero vehicle speed. For example, certain torque management strategies may choose to reduce energy losses by canceling or partially canceling drive torque with braking torque in lieu of allowing the drive torque and brake torque to be applied simultaneously. In that case, torque steps or spiking may occur, due to torque sign changes, when transitioning through zero mph.

A preliminary novelty search developed the following U.S. Patents as evidencing the state of the art: U.S. Pat. Nos. 4,629,043; 5,376,869; 5,467,275; 5,757,153; and 5,984,034.

SUMMARY OF THE INVENTION

The present invention relates to the implementation, within a comprehensive torque management strategy, of a sub-strategy for torque management at incipient vehicle rollback that avoids undesirable outcomes, such as those mentioned above. It is believed that the inventive principles can contribute to improved operating efficiency of an electric vehicle while still controlling incipient vehicle rollback.

One general aspect of the invention relates to a motor vehicle comprising road-engaging wheels, a powertrain comprising a rotary electric machine that is operatively coupled through a drivetrain to the road-engaging wheels and that is capable both of delivering traction torque to the wheels and of imposing regenerative braking torque on the wheels, and friction brakes for applying friction brake torque to the wheels. A throttle request source is selectively operable by a driver of the vehicle to request traction torque for accelerating the vehicle. A brake request source is selectively operable by the driver to request brake torque for braking the vehicle. At least one processor provides a motor torque request to the rotary electric machine and a friction brake torque request to the friction brakes. The at least one processor processes data that includes a request from the throttle request source and a request from the brake request source to develop a torque modification that defines an appropriate regeneration torque component of the motor torque request to the electric machine. The at least one processor also processes data that includes a request from the throttle request source and a request from the brake request source, data that defines a regeneration limit, and data that distinguishes between the vehicle being in a non-rollback state wherein the direction of vehicle motion is not contrary to that selected by a selector mechanism associated with the powertrain and the vehicle being in an incipient rollback state wherein the direction of vehicle motion is contrary to that selected by the selector mechanism, to develop the torque modification, the friction brake torque request, and a total torque that is used in subsequent processing that develops the motor torque request. Certain change in the request from the throttle request source calling for a decrease in traction torque is effective to create corresponding compression regenerative braking torque simulating the compression braking that would occur in an internal combustion when a depressed throttle of such an engine is released. In both the rollback and non-rollback states, the brake torque request from the brake request source, a request from the throttle request source calling for compression regenerative braking torque, and the torque modification are assigned the same algebraic sign, and a request from the throttle request source calling for traction torque is assigned an opposite algebraic sign. In the non-rollback state, the at least one processor develops the total torque by the algebraic summation of the request from the brake request source and the request from the throttle request source, and in the rollback state, the at least one processor develops the total torque by the subtraction of the request from the brake request source from the request from the throttle request source and sets the regeneration limit equal to the request from the throttle request source.

Another general aspect relates to the method embodied in the immediately preceding description.

Further aspects will be seen in various features of a presently preferred embodiment of the invention that will be described in detail.

BRIEF DESCRIPTION OF THE DRAWINGS

The drawings that will now be briefly described are incorporated herein to illustrate a preferred embodiment of the invention and a best mode presently contemplated for carrying out the invention.

DESCRIPTION OF THE PREFERRED EMBODIMENT(s)

Figure 1:
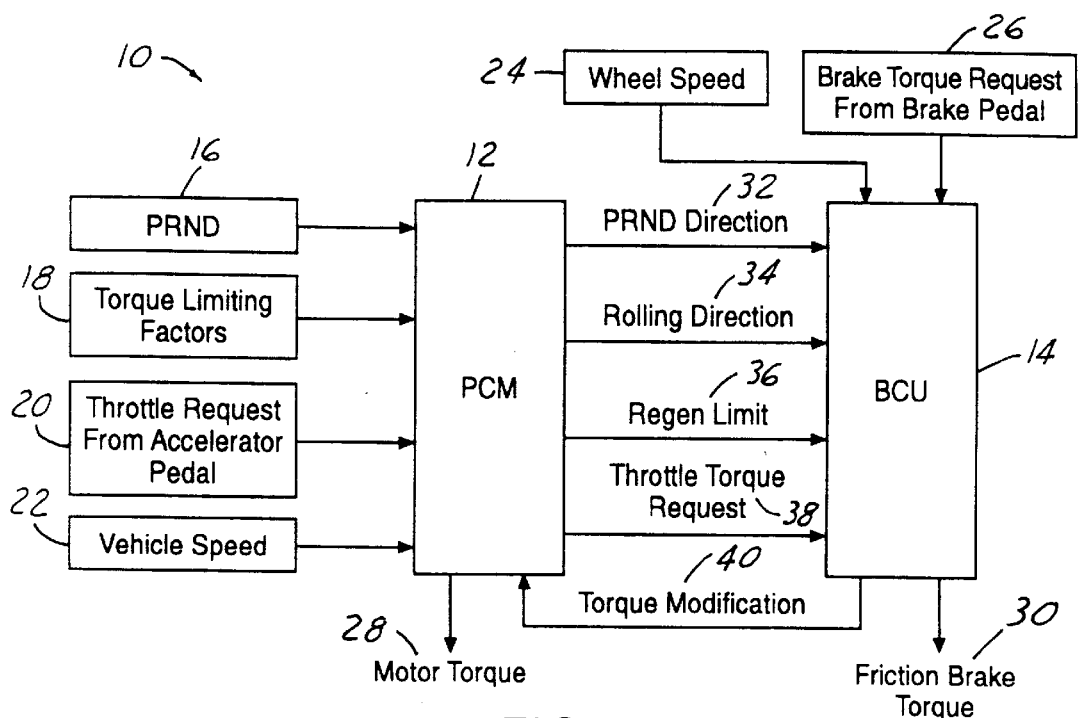
FIG. 1 is a general schematic diagram of a representative torque controller for a vehicle powerplant, including a PCM and BCU.

FIG. 1 shows a representative torque controller 10 for the powerplant of an electric automotive vehicle. It includes a powertrain control module (PCM) 12 and a brake control unit (BCU) 14. It should be appreciated that the descriptive term control module, or control unit, is used in a generic sense, and not in a limiting sense, to designate an electronic unit that comprises an assembly that comprises various electronic components, including a processor, for processing various data inputs and delivering various data outputs to perform selected functions in the manner herein described.

The vehicle powerplant comprises a rotary electric machine that can operate either as an electric motor for propelling the vehicle or as an electric generator for braking the vehicle. The vehicle also includes a service brake system for braking the vehicle via the application of friction brakes. Application of the friction brakes may be accomplished in any suitable way, such as by a driver of the vehicle depressing a brake pedal to actuate the brakes via electric-, hydraulic-, or pneumatic-actuation. Torque controller 10 may also apply the friction brakes independent of the driver to overcome motor braking torque deficiencies. A drivetrain couples the electric motor to driven wheels, and because of the bi-directional capability of a rotary electric machine operating as an electric motor, it may contain a direct drive transmission controlled by a multi-position selector that is operable by the driver to different gears. In the vehicle described here, gear selections are Park (P), Reverse (R), Neutral (N), and Drive (D). When the selector is placed in Drive (D), the electric machine, operating as a motor, can propel the vehicle in a forward direction; when placed in Reverse (R), in a rearward direction. When the electric machine operates as a generator, it forms a load that opposes motion of the vehicle by imposing regenerative braking torque, regardless of the selector position. Regenerative braking is any form of braking imposed on the powertrain which recovers kinetic energy from the powertrain for immediate use elsewhere or for later use in any of various ways by temporary storage of recovered energy in a suitable on-board storage medium.

In Park (P) and Neutral (N), rotary motion cannot be transmitted from the electric machine to the wheels; however it may be decided to allow rotary motion to be transmitted from the wheels to the electric machine while in Park (P) or Neutral (N). The difference between Park (P) and Neutral (N) is that in the former gear, a means for locking the drivetrain at near zero vehicle speeds (typically with the use of a parking pawl) is applied, while in the latter gear the locking means is not applied. For propelling the vehicle in either forward or reverse, there is an accelerator, or throttle, that is operated by the driver, typically by an accelerator pedal.

Data inputs that are utilized by PCM 12 pursuant to principles of the invention include: selected transmission gear data 16, typically obtained from the gear selector mechanism; certain torque limiting features 18, such as any factor that may inhibit the energy storage device (i.e., the battery) from receiving or delivering electric current (i.e., high state of charge), or any factor that may inhibit any part of the drivetrain from producing regenerative torque (i.e. drivetrain temperatures, battery temperatures, high voltage limits, etc.); throttle request data 20, typically obtained from a sensor, such as a throttle position sensor, associated with the accelerator pedal, to provide data representing the extent to which the driver is depressing the accelerator pedal; and vehicle speed data 22. Communication of electronic data between various devices in the vehicle occurs via a communication, or data, bus on which data is broadcast at suitable update rates.

Data inputs that are utilized by BCU 14 pursuant to principles of the invention include: wheel speed data 24, typically obtained from wheel speed sensors; and brake torque request data 26, obtained from any suitable sensor for sensing the extent to which the driver is depressing a brake pedal, i.e. a stroke sensor or a pressure sensor for example. One data output of PCM 12 is motor torque 28 for operating the rotary electric machine, and one data output of BCU 14 is friction brake torque 30 for operating the friction brakes.

Other data outputs of PCM 12 provide data inputs to BCU 14, and they include: data 32 for distinguishing the placement of the selector in Drive (D) from placement in Reverse (R). Park (P) and Neutral (N) may be considered drive gears. Data 34 for identifying the actual direction of vehicle motion, either forward or backward; data 36 defining a regeneration limit; and data 38 defining throttle torque request, which is determined within PCM 12 from multiple inputs to PCM 12 including throttle request data 20 and vehicle speed data 22 and may be modified by certain torque limiting factors 18 under certain conditions. Another data output of BCU 14 that forms an input to PCM 12 is data 40 that defines a calculated torque modification. Braking of the vehicle may be accomplished either by the application of the friction brakes at the individual road-engaging wheels, or by regenerative braking that uses kinetic energy of the moving vehicle to operate the electric machine as an electric generator.

Acceleration of the vehicle is requested by sufficiently depressing the accelerator pedal of the vehicle. The throttle position sensor generates throttle request data 20 according to the extent to which the accelerator pedal is being depressed. Throttle request data is synonymous with accelerator request data, and the two terms may sometimes be used interchangeably. Throttle request data may result in a throttle torque request 38 calling either for traction torque for accelerating the vehicle or for compression regenerative braking torque for decelerating the vehicle.

Compression regenerative braking is regenerative braking that results from releasing the accelerator pedal in order to simulate the compression braking that would occur in the same situation in a vehicle whose powertrain comprises an internal combustion engine. It is believed that this simulation may promote better acceptance of electric vehicles by drivers who are familiar with internal combustion engine powered vehicles, but not with electric drive vehicles. A throttle torque request for decelerating the vehicle may be generated at certain speeds and at throttle positions at or near lift throttle, simulating the lift throttle deceleration torque that is produced in a vehicle equipped with a conventional internal combustion engine and transmission. This lift throttle deceleration torque is synonymous with compression braking torque, and in an electric drive vehicle, the compression braking torque is simulated by regenerative braking torque.

PCM 12 controls powertrain torque developed by the vehicle powerplant, in this instance motor torque developed by the rotary electric machine. When the machine is energized to propel the vehicle forward by delivering to the driven wheels traction torque for accelerating the vehicle forward, the machine operates as an electric motor, and the motor torque is considered positive. When the vehicle is moving forward, and energizing of the electric machine ceases, the machine may operate as a generator to impose regenerative braking on the wheels, in which case motor torque is considered negative. However, when the electric machine is operating as a motor to propel the vehicle backward, the motor torque is considered negative, and when the machine ceases to be energized it may operate to impose regenerative braking, in which case the motor torque is considered positive.

The vehicle powertrain comprises a drivetrain through which torque, as determined by the PCM's control of the powerplant, is applied to road-engaging wheels of the vehicle. The applied torque is the algebraic summation of the throttle torque request 38 as modified by any torque modification 40. The applied torque may be either positive or negative, depending on the result of the algebraic summation.

It is PCM 12 that maintains control over motor torque 28, and although BCU 14 may request a modification of that torque by torque modification data 40 which it supplies to PCM 12, any requested torque modification data 40 is subject to values of the data which PCM 12 itself furnishes to BCU 14, namely regeneration limit data 36 and throttle torque request data 38, and in any event, PCM 12 will not process requested torque modification data 40 in any situation where it determines that processing of such torque modification request data would be inappropriate for presently prevailing values of all data that PCM 12 utilizes in controlling the machine.

Likewise it is BCU 14 that maintains control over friction brake torque, and although PCM 12 may in effect, for various combinations of values of regeneration limit data 36 and throttle torque request data 38 which it calculates, request BCU 14 to request friction brake torque, BCU 14 will not process friction brake torque request data in any situation where it determines that processing of such brake torque request data would be inappropriate for presently prevailing values of all data that BCU 14 utilizes in controlling the friction brakes.

Transfer of data between PCM 12 and BCU 14 may be accomplished by any suitable medium, such as the communication bus, and it is understood that data from all relevant sources is also made available to PCM 12 and BCU 14 on such a data link, even if not expressly shown in the drawings.

Rollback may be sensed in any suitably appropriate manner. For example, information obtained from the selected gear, (P), (R), (N), (D) 32, and from the vehicle rolling direction 34, is sufficient to determine rollback. Moreover, with the possible exception of Park (P), rollback may occur in any selected PRND direction. It is then that the sub-strategy for torque management at incipient vehicle rollback is invoked. BCU 14 uses the rollback state to properly process data such that motor and brake torque are properly managed during this time. Importantly, it processes data differently depending on whether the vehicle is rolling backward with the gear selector in Reverse (R) or in Drive (D), or whether the vehicle is rolling forward with the gear selector in Drive (D) or Reverse (R).

Figure 2:
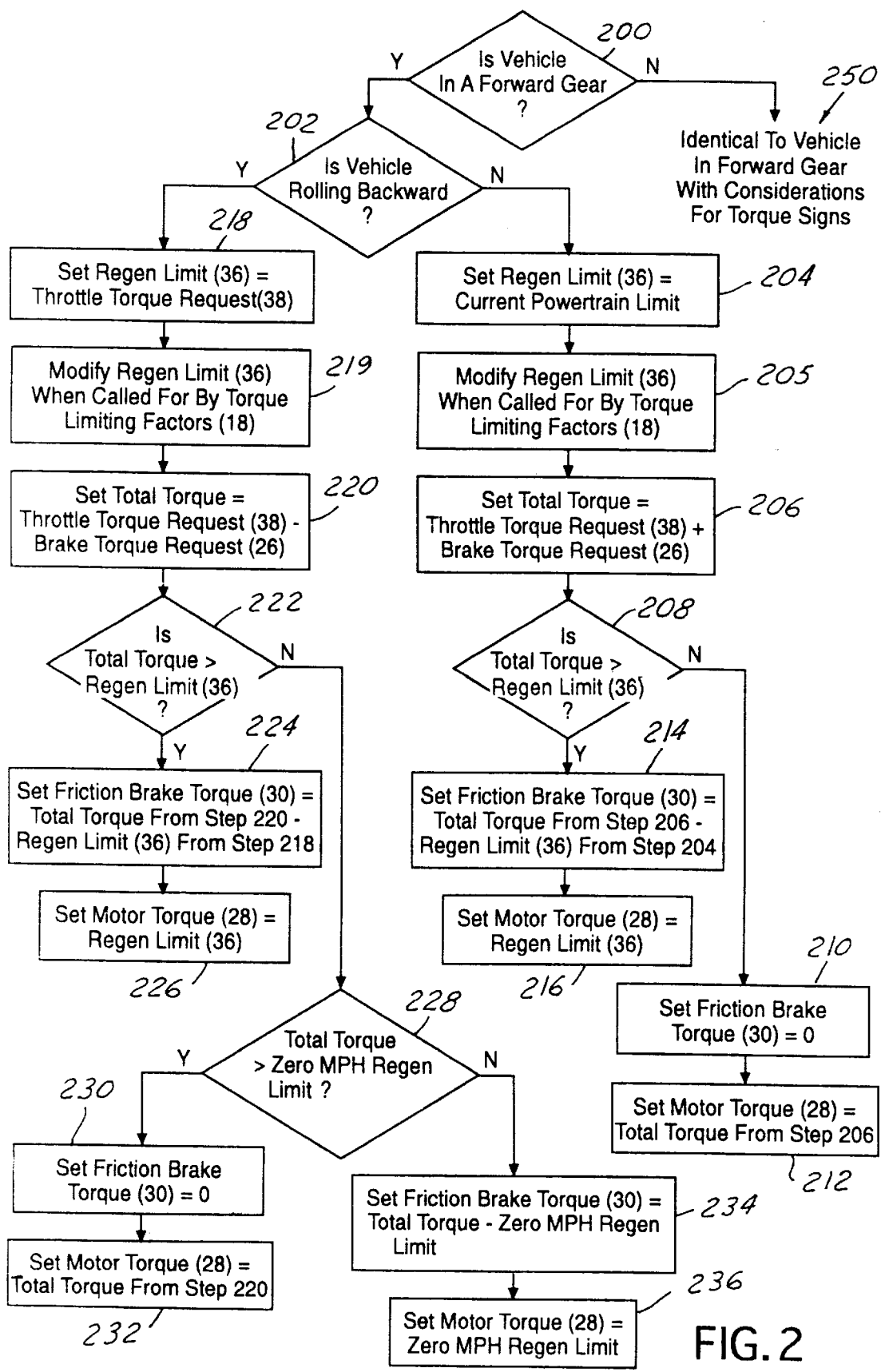
FIG. 2 is a flow diagram illustrating brake torque management strategy that includes a rollback sub-strategy.

The sub-strategy for brake torque management at incipient vehicle rollback is included in the flow diagram of FIG. 2. The representative graph plots of FIGS. 3 and 4 should also be considered in the context of including the rollback strategy as part of the overall strategy.

Figure 3:
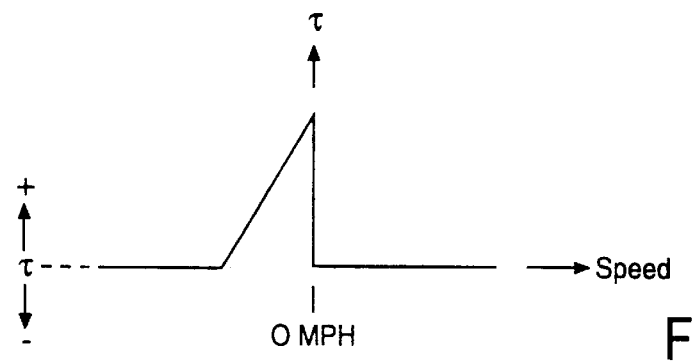
FIG. 3 is a representative regeneration torque limit vs. speed graph plot relevant to the disclosure.

FIG. 3 presents a representative graph plot of regeneration torque limit versus vehicle speed when it is deemed inappropriate for the on-board electric power supply for the rotary electric machine to recover regenerative braking energy, for example when the power supply has a high state of charge, or when the electric machine and/or supporting hardware are incapable of producing regenerative braking torque. The regeneration torque limit is zero (i.e. regeneration is disallowed) at all vehicle speeds, except over a small range of speeds immediately below zero miles per hour (0 mph). Within that range the regeneration torque limit is either a decreasing function of vehicle speed as speed becomes increasingly negative (as shown), or a decreasing function of time. If the regenerative braking torque decreases as a function of time however, the drive torque request may have to be increased with respect to time when transitioning between a rollback state and normal rolling direction. This could result in a hesitation in the drive torque during this transition and, therefore the preferred method is decreasing the regenerative braking torque as a function of vehicle speed. It should be noted however that certain electric machines maybe incapable of performing this latter method, or may have to be controlled inefficiently if capable.

Figure 4:
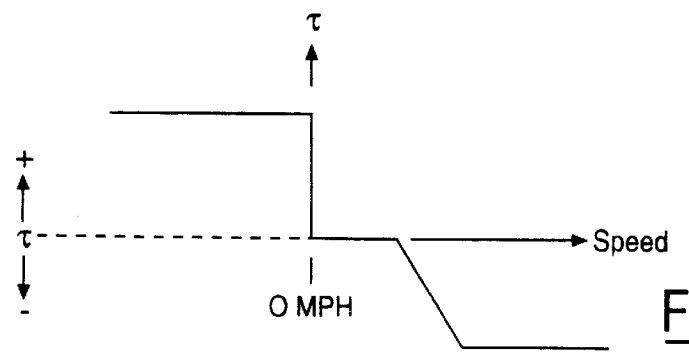
FIG. 4 is another representative regeneration torque limit vs. speed graph plot relevant to the disclosure.

FIG. 4 presents a representative graph plot of regeneration torque limit versus vehicle speed when the onboard electric power supply has a low SOC. For all negative speeds (rollback speeds) and for positive speeds above a certain positive speed, the regeneration torque is limited to a maximum limit. As the positive speed reduces toward zero, it may be desirable to reduce the regeneration torque limit to zero at some calibratable speed above zero for reasons of efficiency. Hence, over a small speed range immediately above that calibratable speed, the regeneration torque limit progressively diminishes from its maximum to zero. In each Figure, the area to the right of the zero mph line represents positive forward vehicle speed while the area to the left represents negative forward vehicle speed. For reconciling the sign reversal as speed passes through zero mph, the sign of the regeneration torque limit also reverses. It should be noted that conditions which affect the extent to which regeneration should be allowed, such as those mentioned above, determine whether regeneration is allowed to occur in accordance with minimum or maximum extremes represented by the respective graph plots of FIGS. 3 and 4 or in accordance with graph plots intermediate the two extremes.

FIG. 2 depicts a non-rollback state by showing that as long as the vehicle is in a forward drive gear such as D (step 200) and the vehicle is not rolling backward (step 202), the basic strategy of the system as described with reference to FIG. 1 is invoked. The value of the Regeneration Torque Limit (Regen Limit 36 in the Figures) is set equal to a value for the current powertrain limit (step 204). The current powertrain limit is derived from a torque/speed relationship for the vehicle powertrain, however prevailing regeneration limiting conditions, such as those described above in connection with FIGS. 3 and 4, may require that the value used for the Regen Limit in subsequent steps be reduced from the value that it would otherwise have based solely on the current powertrain limit obtained from torque/speed relationship. Hence, step 205 shows that the Regen Limit is modified under those circumstances. Because the current powertrain limit can also change as the vehicle is being driven, transitions may, and should, be invoked such that there is no perceivable change to the driver. After step 205 Throttle Torque Request 38 and Brake Torque Request 26 are algebraically summed to yield Total Torque (step 206).

Next the Total Torque and the Regeneration Torque Limit are compared (step 208) to determine Friction Brake Torque. If Total Torque does not exceed the Regeneration Torque Limit, then the value of Friction Brake Torque is set to zero (step 210) so that the friction brakes are not applied, and a value of Torque Modification 40 that causes the Motor Torque 28 to equal the algebraic summation of the Throttle Torque Request 38 and the Brake Torque Request 26 (step 212) is developed and supplied from BCU 14 to PCM 12.

On the other hand, if the Total Torque exceeds the Regeneration Limit 36, then the consequence of step 208 is to cause Friction Brake Torque 30 to equal Total Torque from step 206 minus the Regeneration Limit 36 (step 214), while the Torque Modification 40 assumes a value that causes the Motor Torque 28 to equal the Regeneration Limit 36 (step 216).

It is when the vehicle gear selector is in a forward drive gear but the vehicle is rolling backward that the inventive rollback sub-strategy is invoked. An incipient rollback causes the Regeneration Limit 36 to be immediately set equal to the Throttle Torque Request 38 (step 218), similar to that shown in the negative speed region of FIG. 4; however, the Regeneration Limit 36 is set to the Throttle Torque Request instead of the current powertrain limit. In addition, the Regeneration Limit 36 may be further modified as a function of rollback speed or time because of conditions involving the production of regeneration current and/or ability to convert the regeneration current into stored energy, as discussed above. Hence, such conditions may require that the value used for the Regen Limit in subsequent steps be reduced from the value that it would otherwise have based solely on throttle torque request 38. Hence, step 219 shows that the Regen Limit is modified under those circumstances.

The Total Torque is set equal to the Throttle Torque Request 38 minus the Brake Torque Request 26 (step 220). The implementing algorithm is premised on the understanding that the sign of the Brake Torque Request from the brake pedal is negative when the vehicle is rolling forward and positive when the vehicle is rolling backward, regardless of gear selector position. Hence, subtraction is performed by step 220, whereas an algebraic summation is performed by step 206. The logic in step 220 may also be implemented by using a summation identical to step 206, however, this would require that the brake torque sign not change during a rollback condition, i.e. the brake pedal torque sign is always positive when in a forward gear such as Drive (D) and always negative when in a reverse gear such as Reverse (R). Thus, the resulting Total Torque, using a summation, would be the same in step 220.

Total Torque and the Regeneration Limit 36 are then compared (step 222). If the Total Torque exceeds the Regeneration Limit 36 (which has just been made equal to the Throttle Torque Request 38 because of rollback), then Friction Brake Torque 30 is made equal to a value that will cause the friction brakes to be applied in an amount by which the Total Torque exceeds the Regeneration Torque Limit 36, i.e. exceeds Throttle Torque Request, (step 224), and the Torque Modification will have a value that causes the Motor Torque 28 to equal the Regeneration Torque Limit 36, which may be equal to any value between the Throttle Torque Request as illustrated in FIG. 4 and a limited value as illustrated in FIG. 3 (step 226). If step 222 determines that Total Torque does not exceed the Regeneration Limit 36 as determined in step 218, then Total Torque is compared to a Zero MPH Regeneration Torque Limit (step 228). The Zero MPH Regeneration Torque Limit is the regeneration torque limit that is realized at vehicle speeds of zero MPH with the vehicle rolling in the direction of the gear selector, i.e. not rollback. This torque limit is zero for the purposes of this example (as shown in FIGS. 3 and 4); however it may be set to something other than zero. The purpose of this additional torque limit comparison (step 228) is to ensure that no torque steps or spikes (friction or motor torque) are realized during the transition through zero mph (from rolling forward to rolling backward, or vice versa, in any gear) when both accelerator torque and braking torque are being requested.

If Total Torque exceeds, in the positive direction, the Zero MPH Regeneration Torque Limit, then the Friction Brake Torque 30 is set to zero so that the friction brakes are not applied (step 230), and the Motor Torque 28 is made to equal Total Torque via an appropriate value of Torque Modification 40 (step 232). If step 228 determines that Total Torque does not exceed, in the positive direction, the Zero MPH Regeneration Torque Limit, then the friction brakes are applied in an amount by which Total Torque exceeds, in the negative direction, the Zero MPH Regeneration Torque Limit (step 234), and the Motor Torque 28 is made equal to the Zero MPH Regeneration Torque Limit via an appropriate value of Torque Modification (step 236). The result of the calculation performed by step 234 represents the magnitude of the friction brake torque that is to be applied regardless of whether the result has a positive or negative sign.

It is to be noticed that the two trees of the flow diagram descending from decision step 202, namely a rollback tree and a non-rollback tree, are generally identical, except in two respects. One important difference exists between respective steps 206 and 220. Because the basic non-rollback strategy is premised on Throttle Torque Request 38 always having a positive sign, Brake Torque Request 26 always having a negative sign, and Total Torque being the algebraic summation of the two, as in step 206, implementation of the inventive rollback sub-strategy in conjunction with that overall strategy calls for changing the sign of the Brake Torque Request 26 before it is algebraically summed with the Throttle Torque Request 38 whenever rollback is determined by step 202. Hence, step 220 describes the Brake Torque Request 26 as being subtracted from, whereas step 206 describes it as being added to, Throttle Torque Request 38.

Another difference between the two branches exists between step 218 in the rollback tree and step 204 in the non-rollback tree. To address a rollback, step 218, as explained above, sets the Regeneration Limit 36 to the Throttle Torque Request 38, whereas in a non-rollback state, step 204 sets the Regeneration Limit 36 in accordance with a characteristic like those in the positive vehicle rolling direction of FIGS. 3 and 4 depending on the existing limiting factors such as power supply state of charge. Further differences are found by comparing steps 228, 230, 232, 234, and 236 in the rollback tree with steps 210 and 212 in the non-rollback tree.

Although not expressly shown in full detail in FIG. 2, the reference numeral 250 is intended to denote the implementation of a rollback sub-strategy in conjunction with the basic control strategy when the vehicle is in reverse gear and begins to roll forward down an incline. There are two trees analogous to the rollback and non-rollback trees descending from step 202 but descending from a decision step that corresponds to decision step 202. That corresponding step decides if the vehicle is moving forward while the selector is selecting reverse gear. The calculations involved with the branch represented by numeral 250 are modified appropriately to account for the torque signs associated with reverse gear torques. If it is determined that the vehicle is not rolling forward after step 200 has determined that the vehicle is not in a forward gear, then a sequence of steps commencing with a step like step 204 is followed because rollback is not indicated. On the other hand, if it is determined that the vehicle is rolling forward, then a sequence of steps like the sequence of steps beginning with step 218 is followed. These sequences in both the rollback and the non-rollback trees are the same except for steps corresponding to steps 208, 222, and 228. The steps corresponding to steps 208 and 222 determine if the Total Torque is less than the Regen Limit, and the step corresponding to step 228 determines if Total Torque is less than the Zero MPH Regen Limit. In addition, the Regeneration Torque Limits for reverse gear are similar to those of FIGS. 3 and 4 with the exception that the curves are mirrored (flipped) on both the x (speed) and y (torque) axis (i.e. the curves in quadrants 1 and 3 are mirrored and the curves in quadrants 2 and 4 are mirrored).

Further detail specific to the representative embodiment of FIG. 1 may be found in the commonly-owned, pending patent application of the inventor Ser. No. 09/567,358, filed May 9, 2000. It should be mentioned that in certain vehicles, a vehicle speed of zero mph cannot be specifically sensed because of the nature of the speed sensing system and/or speed sensor; however, rolling direction reversals may be sensed and therefor it may be implied that the vehicle is at or near zero speed until the rolling direction reversal is sensed.

While a presently preferred embodiment has been illustrated and described, it is to be appreciated that the invention may be practiced in various forms within the scope of the following claims.

What is claimed is:

1. A motor vehicle comprising:
   road-engaging wheels;
   a powertrain comprising a rotary electric machine that is operatively coupled through a drivetrain to the road-engaging wheels and that is capable both of delivering traction torque to the wheels and of imposing regenerative braking torque on the wheels;
   friction brakes for applying friction brake torque to the wheels;
   a throttle request source that is selectively operable by a driver of the vehicle to request traction torque for accelerating the vehicle;
   a brake request source that is selectively operable by the driver to request brake torque for braking the vehicle;
   at least one processor for providing a motor torque request to the rotary electric machine and a friction brake torque request to the friction brakes by processing data that includes a request from the throttle request source and a request from the brake request source to develop a torque modification that defines an appropriate regeneration torque component of the motor torque request to the electric machine, and by also processing data that includes a request from the throttle request source and a request from the brake request source, data that defines a regeneration limit, and data that distinguishes between the vehicle being in a non-rollback state wherein the direction of vehicle motion is not contrary to that selected by a selector mechanism associated with the powertrain and the vehicle being in an incipient rollback state wherein the direction of vehicle motion is contrary to that selected by the selector mechanism, to develop the torque modification, the friction brake torque request, and a total torque that is used in subsequent processing that develops the motor torque request;

wherein certain change in the request from the throttle request source calling for a decrease in traction torque is effective to create corresponding compression regenerative braking torque simulating the compression braking that would occur in an internal combustion when a depressed throttle of such an engine is released;

wherein in both the rollback and non-rollback states, the brake torque request from the brake request source, a request from the throttle request source calling for compression regenerative braking torque, and the torque modification are assigned the same algebraic sign, and a request from the throttle request source calling for traction torque is assigned an opposite algebraic sign;

wherein in the non-rollback state, the at least one processor develops the total torque by the algebraic summation of the request from the brake request source and the request from the throttle request source; and in the rollback state, the at least one processor develops the total torque by the subtraction of the request from the brake request source from the request from the throttle request source and sets the regeneration limit equal to the request from the throttle request source.

2. A motor vehicle as set forth in claim 1 in which, in the rollback state, the at least one processor causes the regeneration limit to be a value other than the value corresponding to the throttle torque request when prevailing conditions associated with regeneration call for a value of the regeneration limit lower than the value resulting from equating the regeneration limit to the throttle torque request.

3. A motor vehicle as set forth in claim 1 in which, in the rollback state, the at least one processor compares the total torque with the regeneration limit.

4. A motor vehicle as set forth in claim 3 in which, in the rollback state, the at least one processor sets the friction brake torque request equal to the difference between the total torque and the regeneration limit and sets the motor torque request equal to the regeneration limit, when the total torque exceeds the regeneration limit.

5. A motor vehicle as set forth in claim 3 in which, in the rollback state, the at least one processor compares total torque with a zero vehicle speed regeneration torque limit when the regeneration limit exceeds the total torque.

6. A motor vehicle as set forth in claim 5 in which, in the rollback state, the at least one processor sets the friction brake torque request to zero and sets the motor torque request equal to the total torque when the total torque is greater than the zero vehicle speed regeneration torque limit.

7. A motor vehicle as set forth in claim 5 in which, in the rollback state, the at least one processor sets the friction brake torque request equal to the total torque minus the zero vehicle speed regeneration torque limit and sets the motor torque request equal to the zero vehicle speed regeneration torque limit when the total torque is less than the zero vehicle speed regeneration torque limit.

8. A motor vehicle as set forth in claim 1 in which in the rollback state, the at least one processor modifies the regeneration limit by reducing the regeneration limit as a function of one or both time and vehicle speed.

9. A motor vehicle as set forth in claim 1 in which the at least one processor comprises plural processors, one of which develops the friction brake torque and the torque modification, and the other of which develops both the motor torque request and data defining a direction of rolling of the vehicle and supplies the data defining the direction of rolling to the one processor.

10. A motor vehicle as set forth in claim 1 in which the data that distinguishes between the vehicle being in a non-rollback state wherein the direction of vehicle motion is not contrary to that selected by a selector mechanism associated with the powertrain and the vehicle being in an incipient rollback state wherein the direction of vehicle motion is contrary to that selected by the selector mechanism identifies a rollback state both when the direction of vehicle motion is forward while the selector mechanism is selecting a reverse direction and when the direction of vehicle motion is backward while the selector mechanism is selecting a forward direction.

11. In a motor vehicle comprising:
road-engaging wheels;
a powertrain comprising a rotary electric machine that is operatively coupled through a drivetrain to the road-engaging wheels and that is capable both of delivering traction torque to the wheels and of imposing regenerative braking torque on the wheels;
friction brakes for applying friction brake torque to the wheels;
a throttle request source that is selectively operable by a driver of the vehicle to request traction torque for accelerating the vehicle;
a brake request source that is selectively operable by the driver to request brake torque for braking the vehicle;
at least one processor for providing a motor torque request to the rotary electric machine and a friction brake torque request to the friction brakes by processing data that includes a request from the throttle request source and a request from the brake request source to develop a torque modification that defines an appropriate regeneration torque component of the motor torque request to the electric machine, and by also processing data that includes a request from the throttle request source and a request from the brake request source, data that defines a regeneration limit, and data that distinguishes between the vehicle being in a non-rollback state wherein the direction of vehicle motion is not contrary to that selected by a selector mechanism associated with the powertrain and the vehicle being in an incipient rollback state wherein the direction of vehicle motion is contrary to that selected by the selector mechanism, to develop the torque modification, the friction brake torque request, and a total torque that is used in subsequent processing that develops the motor torque request;

wherein certain change in the request from the throttle request source calling for a decrease in traction torque is effective to create corresponding compression regenerative braking torque simulating the compression braking that would occur in an internal combustion when a depressed throttle of such an engine is released;

a method that comprises distinct processes for rollback and non-rollback states of the vehicle, including;

in both the rollback and non-rollback states, assigning the same algebraic sign to the brake torque request from the brake request source, a compression regenerative braking torque request resulting from change in the request from the throttle request source calling for a decrease in traction torque from the throttle, and the torque modification, and assigning an opposite algebraic sign to a request from the throttle request source calling for traction torque;

in the non-rollback state, developing the total torque by algebraically summing the request from the brake request source and the request from the throttle request source;

in the rollback state, developing the total torque by subtracting the request from the brake request source from the request from the throttle request source; and in the rollback state, setting the regeneration limit equal to the request from the throttle request source.

12. A method as set forth in claim 11 including, in the rollback state, causing the regeneration limit to be a value other than the value corresponding to the throttle torque request when prevailing conditions associated with regeneration call for a value of the regeneration limit lower than the value resulting from equating the regeneration limit to the throttle torque request.

13. A method as set forth in claim 11 including, in the rollback state, comparing the total torque with the regeneration limit.

14. A method as set forth in claim 13 including, in the rollback state when the total torque exceeds the regeneration limit, setting the friction brake torque request equal to the difference between the total torque and the regeneration limit and setting the motor torque request equal to the regeneration limit.

15. A method as set forth in claim 13 including, in the rollback state when the regeneration limit exceeds the total torque, comparing total torque with a zero vehicle speed regeneration torque limit.

16. A method as set forth in claim 15 in which in the rollback state when the total torque is greater than the zero vehicle speed regeneration torque limit, setting the friction brake torque request to zero and setting the motor torque request equal to the total torque.

17. A method as set forth in claim 15 in which in the rollback state when the total torque is less than the zero vehicle speed regeneration torque limit, setting the friction brake torque request equal to the total torque minus the zero vehicle speed regeneration torque limit and setting the motor torque request equal to the zero vehicle speed regeneration torque limit.

18. A method as set forth in claim 11 in which in the rollback state, modifying the regeneration limit by reducing the regeneration limit as a function of one or both time and vehicle speed.

19. A method as set forth in claim 11 in which the data that distinguishes between the vehicle being in a non-rollback state wherein the direction of vehicle motion is not contrary to that selected by a selector mechanism associated with the powertrain and the vehicle being in an incipient rollback state wherein the direction of vehicle motion is contrary to that selected by the selector mechanism is developed to identify a rollback state both when the direction of vehicle motion is forward while the selector mechanism is selecting a reverse direction and when the direction of vehicle motion is backward while the selector mechanism is selecting a forward direction.

* * * * *